(12) United States Patent
Cheng et al.

(10) Patent No.: US 7,072,261 B2
(45) Date of Patent: Jul. 4, 2006

(54) DRIVING METHOD

(75) Inventors: Kuo-Hsien Cheng, Ilan (TW); Hsin-Tung Yu, Keelung (TW); Shun-Yi Tung, Taoyuan (TW)

(73) Assignee: Benq Corporation, Taoyuan (TW)

( * ) Notice: Subject to any disclaimer, the term of this patent is extended or adjusted under 35 U.S.C. 154(b) by 563 days.

(21) Appl. No.: 10/452,718

(22) Filed: Jun. 3, 2003

(65) Prior Publication Data
US 2003/0227661 A1    Dec. 11, 2003

(30) Foreign Application Priority Data
Jun. 7, 2002    (TW) ................................ 91112456 A

(51) Int. Cl.
G11B 7/00        (2006.01)
G02B 26/08       (2006.01)
(52) U.S. Cl. ..................................... 369/53.25; 359/223
(58) Field of Classification Search ............. 369/53.25, 369/53.38, 53.11; 359/223
See application file for complete search history.

(56) References Cited
U.S. PATENT DOCUMENTS
4,730,298 A * 3/1988 Takahashi .................. 369/111

2002/0080701 A1 * 6/2002 Nakajima ................. 369/53.22
2005/0083800 A1 * 4/2005 Okada et al. ............. 369/44.28

* cited by examiner

Primary Examiner—Angel Castro
(74) Attorney, Agent, or Firm—Rabin & Berdo P.C.

(57) ABSTRACT

A method for driving a movable component of a hardware device includes the steps of: (1) driving the movable component to move the driving distance by the former force to determine a base time; (2) setting a reference time, wherein the reference time is smaller than the base time; (3) determining a former period according to the reference time, and determining the former distance and the latter distance according to the former time, the former force and the base time; and (4) determining a latter period according to the latter force and the latter distance, wherein the movable component is driven by the former force for the former period and then is driven by the latter force for the latter period. Another method for driving a movable component of a hardware device includes the steps of: (1) calculating an advancing time, which is required for the movable component to move the driving distance; (2) adjusting at least the former period or the latter period according to the advancing time so that a sum of the former period and the latter period is substantially equal to the advancing time; and (3) driving the movable component by the former force for the former period and driving the movable component by the latter force for the latter period.

21 Claims, 4 Drawing Sheets

DRIVING METHOD

This application claims the benefit of Taiwan application Ser. No. 91112456, filed Jun. 7, 2002.

BACKGROUND OF THE INVENTION

1. Field of the Invention

The invention relates in general to a driving method, and more particularly to a method for driving a movable component of a hardware device.

2. Description of the Related Art

Among various computer peripherals, the optical drive has become an essential equipment for users of the personal computer. Presently, the controlling method for loading and unloading the tray is the identical procedure for every optical drive. However, giving a fixed force to the tray with varied friction force may cause unsteady operation. When the friction force decreases, the tray can easily go beyond the designated position and get stuck, generating noise due to the tray vibration. When the friction force increases, the tray halts before arriving at the designated position, which may bring the user great inconvenience. Therefore, for the manufacturers of optical drives, the approach to make the operation of loading and unloading the tray smooth becomes a crucial technique.

Referring to FIG. 1, the inner structure of the optical drive is shown. In general, several stoppers 130 are disposed on the casing of the optical drive 100 to absorb the shock from the tray 110. When loading the tray 110, the stoppers 130 absorb the shock as the tray 110 hits the rear of the casing. When unloading the tray 110, the stoppers 150 prevent the tray 110 from coming off the casing. It takes more force to make the tray 110 move from rest by overcoming the maximum static friction force than to keep it moving once it is in motion. Before arriving at the designated position, the tray 110 makes contact with a switch to stop the motor from continuing to provide the tray 110 with any driving force. The tray 110 subsequently keeps on moving along the guides 120. If the tray 110 is still in motion when arriving at the designated position, the tray 110 come to easily shake and possibly cause damage to the components. Since it requires forces of two different strengths to push the tray 110, it therefore requires two different voltages for the motor to provide two different forces. At first, the motor provides a larger former force according to a larger first voltage to drive the tray 110 to move a former distance and then provides the smaller latter force according to a smaller second voltage to drive the tray 110 to move a latter distance. After the smaller latter force drives the tray 110 to move the latter force, the tray 110 makes contact with a switch to stop the motor from continuing to provide the tray 110 with any force. The tray 110 keeps on moving due to its inertia. However, the kinetic friction force between the tray 110 and the guide 120 opposes the motion of the tray 110. By means of a design, the tray 110 gradually slows down and finally stops at the designated position as soon as the tray 110 touches the stoppers 130 or 150.

Referring to FIG. 2A, the diagram shows the method for driving the tray of the optical drive by adjusting the voltage. The motor provides a larger former force according to a larger first voltage V1 to drive the tray 110 to move for a period t1 and then provides the smaller latter force according to a smaller second voltage V2 to drive the tray 110 to move for a period t2. Subsequently, the tray 110 keeps on moving due to its inertia until the tray 110 arrives at the designated position. Referring to FIGS. 2B to 2D, the tray 110 at rest is driven by voltage V1 to move a former distance S1 for a period t1 and then is driven by voltage V2 to move a latter distance S2 for a period t2. Once the tray 110 touches off a switch sw, the motor stops providing the tray 110 with any force. The tray 110 keeps on moving a sliding distance Ss due to its inertia and finally comes to a halt, as shown in FIG. 2E.

In the above-mentioned driving method, the periods t1 and t2, for which the motor drives the tray 110 with the first voltage V1 and second voltage V2 respectively, might produce the following problems:

1. The method for driving the tray 110 is the identical procedure for every optical drive regardless of the differences produced by the manufacturing process, such as the differences in the friction force between the tray 110 and the guide 120, for example.

2. The components of the optical drive will be worn out after being used for a period of time, and the friction forces among the components will change as well. Thus, after a period of time, the original driving method might not be able to drive the tray 110 to stop at the designated position perfectly.

3. The friction force between the tray 110 and the guide 120 varies with the operation condition of the optical drive. For example, the identical driving method fails to fit in with both the vertical placement and horizontal placement of the optical.

It is impossible that the identical driving method suits every different situation that is listed above. The tray 110 might halt before arriving at the designated position. The tray 110 might hit the stoppers 150 with a remained speed and therefore generate noise due to the tray vibration, and damage other components.

SUMMARY OF THE INVENTION

It is therefore an object of the invention to provide a method for driving a movable component of a hardware device, which is consistent in the driving result for every optical drive with different manufacturing tolerances and at every different using age.

The invention achieves the above-identified objects by providing a method for driving a movable component of a hardware device, the method including the steps of: (1) driving the movable component to move the driving distance by the former force to determine a base time; (2) setting a reference time, wherein the reference time is smaller than the base time; (3) determining a former time according to the reference time, and determining the former distance and the latter distance according to the former time, the former force and the base time; and (4) determining a latter time according to the latter force and the latter distance, wherein the movable component is driven by the former force for the former time and then is driven by the latter force for the latter time.

The invention achieves the above-identified objects by providing another method for driving a movable component of a hardware device, and the method includes the steps of: (1) calculating an advancing time, which is required for the movable component to move the driving distance; (2) adjusting at least one of the former time or the latter time according to the advancing time so that a sum of the former time and the latter time is substantially equal to the advancing time; and (3) driving the movable component by the former force for the former time and driving the movable component by the latter force for the latter time.

Other objects, features, and advantages of the invention will become apparent from the following detailed description of the preferred but non-limiting embodiments. The following description is made with reference to the accompanying drawings.

DETAILED DESCRIPTION OF THE INVENTION

The driving method according to the invention is used for driving a movable component of a hardware device. The hardware device can be an optical drive while the movable component can be a tray, for example.

As stated above, even if the optical drives, for example CD-ROM drives, are of the same model, each drive has its own individual differences. Applying the same driving method to all CD-ROM drives by disregarding the individual differences cannot render the same performance and results in difficulties in controlling the product quality. Therefore, the invention discloses a driving method, which can be modified according to each individual device to compensate the possible differences to achieve a perfect driving result. On the other hand, the user might use different placements of the CD-ROM drive as the manufacturer intended and therefore the original driving method fails to fit in with the different placements. Additionally, after the CD-ROM drive is used for a period of time, the worn out components of the CD-ROM drive will affect the driving effect. Hence, the invention provides an approach for making the driving method adjustable according the tray's movement to suit the actual situation.

Figure 1:
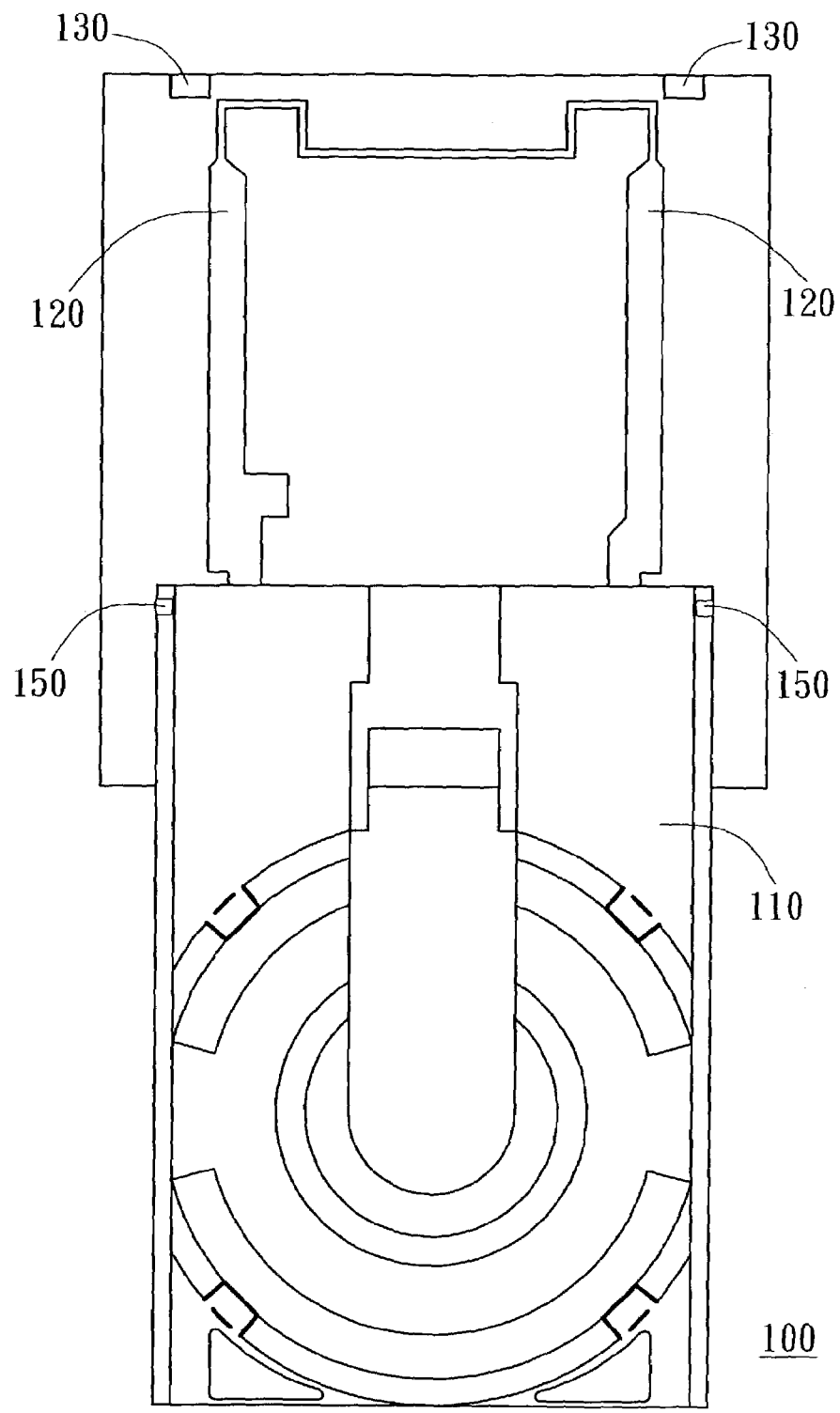
FIG. 1 (Prior Art) is the inner structure of the optical drive.
Figure 2A:
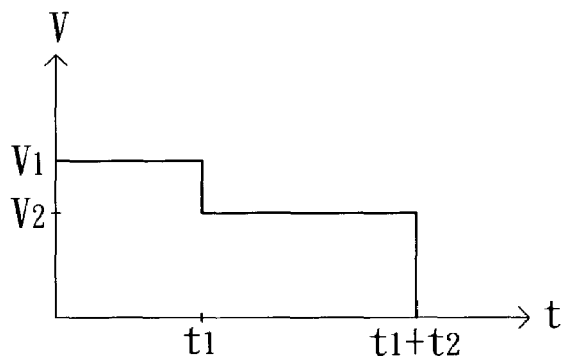
FIG. 2A (Prior Art) is a diagram showing the method for driving the tray of the optical drive by adjusting the voltage.
Figure 2B:
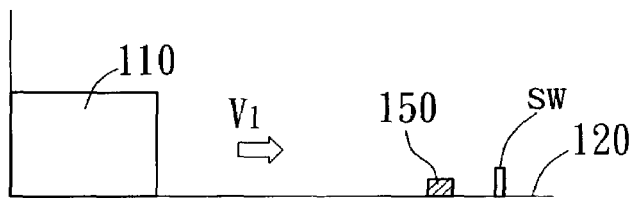
FIG. 2B (Prior Art) shows the position of the tray of the optical drive before being driven.
Figure 2C:
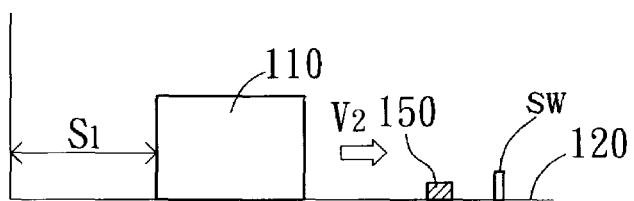
FIG. 2C (Prior Art) shows that the tray of the optical drive is driven by the former force to move a former distance along the guide.
Figure 2D:
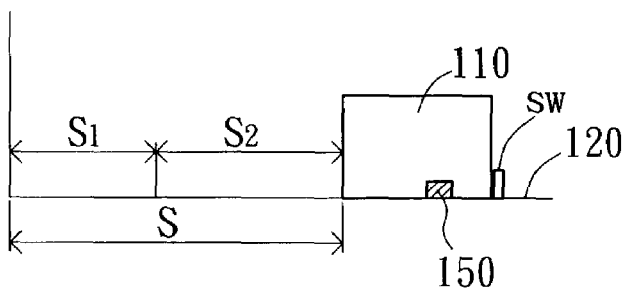
FIG. 2D (Prior Art) shows that the tray of the optical drive is driven by the latter force to move a latter distance along the guide.
Figure 2E:
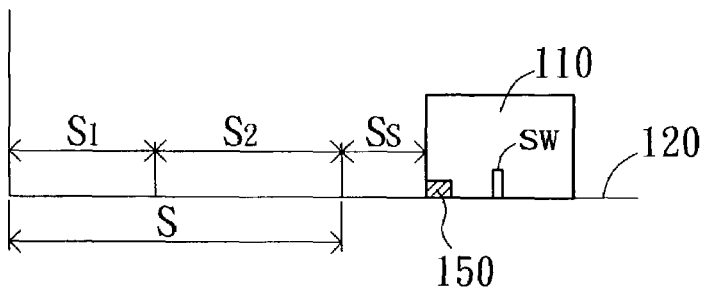
FIG. 2E (Prior Art) shows that the tray of the optical drive continues to move a sliding distance due to its inertia and comes to a halt.
Figure 3A:
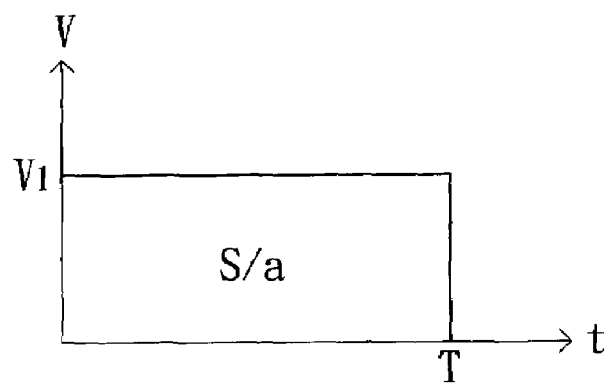
FIG. 3A is a diagram showing a driving method of determining the base time according to a first embodiment of the invention.

Referring to FIG. 3A, the diagram shows a driving method for determining the base time according to a first embodiment of the invention. In practice, the motor provides a former force according to a fixed voltage V1 to drive the tray of the CD-ROM drive to move a driving distance S. The time required for the tray to move the driving distance S is determined and defined to be a base time T.

Since each device has its own individual difference, the trays of different CD-ROM drives driven with the same voltage V1 require different base time T values to move the same driving distance S. Therefore, it is more objective to redefine the driving method according to individual base time T than to simply apply the identical driving method to drive all CD-ROM drives. The tray as driven by the motor for the time T can move the distance S while the velocity of the tray and the voltage for the motor keep as V1. As shown in FIG. 3A, the area under the function of the voltage V for the motor and time t is equal to the distance that the tray is driven to move along the guide. Thus, the driving distance S is equal to the product of the voltage V1 and the base time T and a constant a, i.e. $S=a*V1*T$.

Figure 3B:
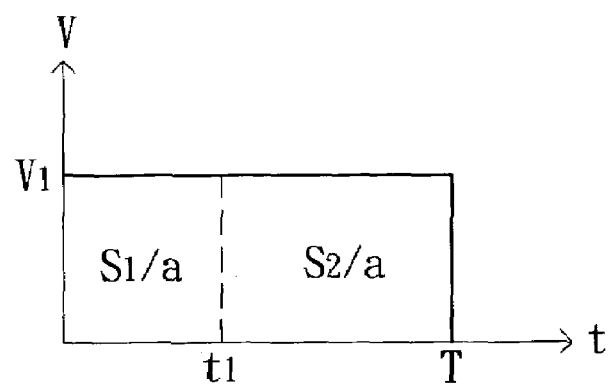
FIG. 3B is a diagram illustrating the method of determining the former and latter distances according to a first embodiment of the invention.

Referring to FIG. 3B, the diagram illustrates the method of determining the former and latter distances according to a first embodiment of the invention. On the basis of FIG. 3A, a reference time t1 that is smaller than the base time T can be set. Apparently, the driving distance S is divided into the former distance S1 and the latter distance S2. The time for which the tray driven by the voltage V1 moves the driving distance S required is the base time T. The distance that the tray moves from 0 to t1 is the former distance S1. The distance that the tray moves from t1 to T is the latter distance S2. The former distance S1 and the latter distance S2 are added up to be the driving distance S. In addition, the period that the tray moves from 0 to t1 is determined and defined to be the former period t1, since the tray moves the former distance S1 in this former time. The former distance S1 is equal to the product of the voltage V1 and the former period t1 and a constant a, i.e. $S1=a*V1*t1$. Since the driving distance S is known, the latter distance S2 is therefore obtained and expressed as $$S2=S-S1=a*V1*(T-t1).$$

Figure 3C:
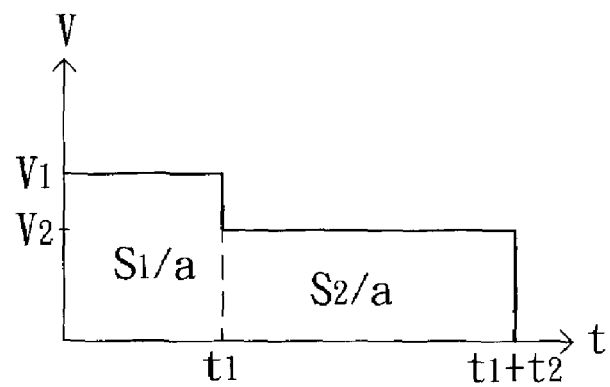
FIG. 3C is a diagram illustrating the method of determining the latter period according to a first embodiment of the invention.

Referring to FIG. 3C, the diagram illustrates to the method of determining the latter period according to a first embodiment of the invention. The latter force is smaller than the former force and can be provided by the motor according to a voltage V2 lower than the voltage V1. Since the voltage V2 is lower than the voltage V1, the tray driven by the voltage V2 takes a longer time (t2>T−t1) to move the latter distance S2. The period that the tray moves from t1 to t1+t2 is determined and defined to be the latter time t2 since the tray moves the latter distance S2 in this period. The latter period t2 can be obtained and expressed as $t2=S2/(a*V2)$. Also, the latter distance S2 in FIG. 3B is equal to the latter distance S2 in FIG. 3C, and therefore the latter period t2 can also be obtained and expressed as $t2=V1*(T-t1)/V2$. Since the voltages V1 and V2 and the base time T are already known, the latter period is thus obtained. Then the driving method that is subject to the design for individual CD-ROM is finished. The method to drive the tray to move the driving distance S is to drive the tray by a former force according to the voltage V1 for the former period t1 and then to drive the tray by a latter force according to the voltage V2 for the latter period t2.

The friction forces between the trays and the guides for different CD-ROM drives are usually different. It is unreasonable to use the identical driving mode with the voltages V1 and V2, and the former period t1 and latter period t2 to drive every different CD-ROM drive. If the friction force between the tray and the guide is too large for a CD-ROM drive, the tray probably halts before arriving at the designated position. On the contrary, if the friction force between the tray and the guide is too small for a CD-ROM drive, the tray causes vibration of the CD-ROM drive while arriving at the designated position by hitting the stopper. Therefore, the driving method according to the first embodiment is adjusted to the actual friction force to suit every CD-ROM drive so that the driven tray can exactly stop at the designated position. The different driving modes have variations in setting the base time T and the latter period. If the friction force between the tray and the guide is large, the base time T and the latter period are set to be large accordingly. If the friction force between the tray and the guide is small, the base time T and the latter period are set to be small accordingly.

Figure 4A:
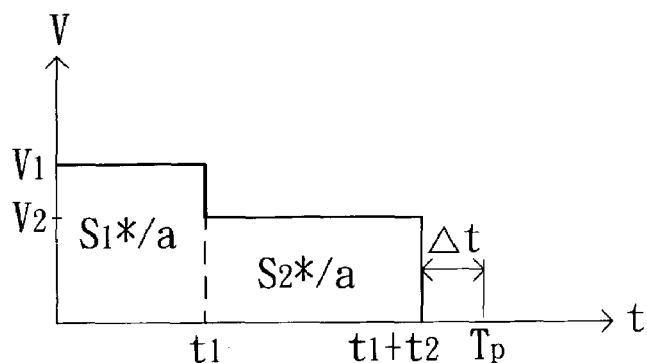
FIG. 4A shows that the driving effect of the optical drive is influenced by indefinite factors.

Please refer to both FIG. 3C and FIG. 4A. FIG. 4A shows that the driving effect of the CD-ROM drive is influenced by indefinite factors. In the beginning, the tray is driven by the voltage V1 for the former period t1 and then is driven by the voltage V2 for the latter period t2. The total distance that the tray advances is the driving distance S, which is the sum of the former distance S1 and the latter distance S2. However, the friction force might increase due to the worn out components of the CD-ROM drive after the CD-ROM drive is used for a period of time. Hence, the distance that the tray is driven by the voltage V1 for the former period t1 becomes S1* while the distance that the tray is driven by the voltage V2 for the latter period t2 becomes S2*. The tray is driven to advance the sum of the distances S1* and S2*, which is smaller than the driving distance S. It requires a longer time Tp for the tray to move the driving distance S due to the increase of the friction force. Before the driving mode is adjusted, the latter force is no longer applied to the tray at the time (t1+t2) while the tray has not moved distance S. The tray 110 subsequently moves without any applied driving force from the time (t1+t2) to the time Tp. In order to improve the condition, the advancing time Tp for which the tray moves the driving distance S can be first calculated, and then the former period t1 and the latter period t2 can be adjusted according to the advancing time Tp so that the sum of the former period t1 and the latter period t2 is equal to the advancing time Tp.

Figure 4B:
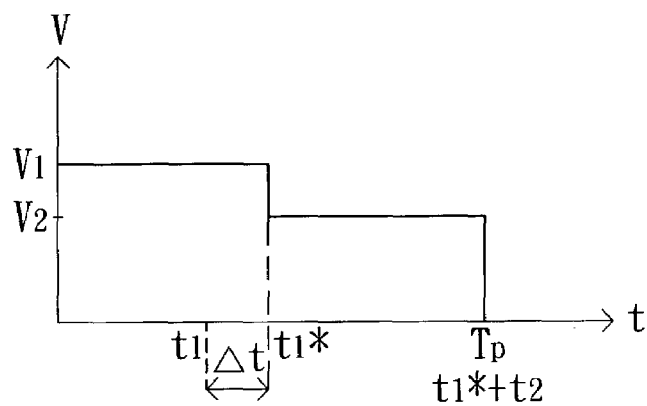
FIG. 4B is a diagram illustrating the method of adjusting the former period according to a second embodiment of the invention.

Referring to FIG. 4B, the diagram illustrates how to adjust the former period according to a second embodiment of the invention. The time difference $\Delta t$ can be added to the former period t1 so that the adjusted former period t1* is equal to the sum of original former period t1 and the time difference $\Delta t$. The former period is adjusted with the latter period fixed so that a sum of the former period and the latter period is equal to the advancing time Tp. The adjustment aims to prevent the tray from coming to a halt before arriving at the designated position by extending the time that the motor drives the tray for the next operation of driving the tray.

Figure 4C:
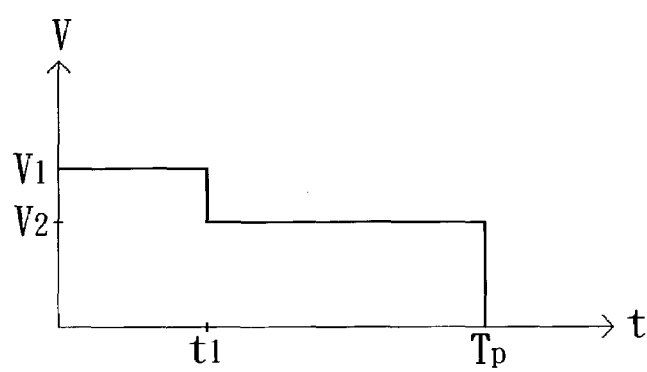
FIG. 4C is a diagram illustrating the method of adjusting the latter period according to a second embodiment of the invention.

Referring to FIG. 4C, the diagram illustrates how to adjust the latter period according to a second embodiment of the invention. The time difference $\Delta t$ can be added to the latter period t2 so that the adjusted latter period t2* is equal to the sum of original latter period t2 and the time difference $\Delta t$. The latter period is adjusted with the former period fixed so that a sum of the former period and the latter period is equal to the advancing time Tp.

Figure 4D:
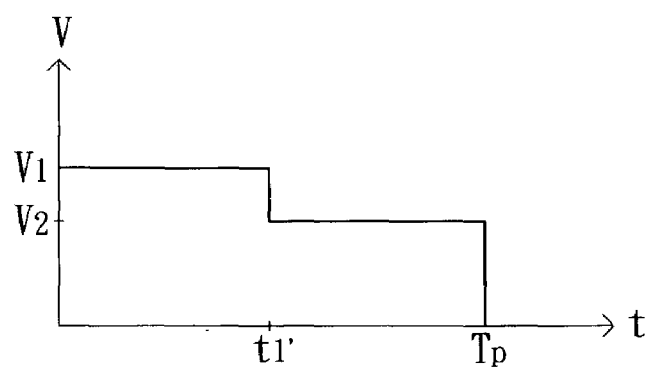
FIG. 4D is a diagram illustrating the method of adjusting both the former period and the latter period according to a second embodiment of the invention.

Referring to FIG. 4D, the diagram illustrates the way to adjust both the former period and the latter period according to a second embodiment of the invention. The original former period t1 is adjusted to be t1' while the original latter period t2 is adjusted to be the difference of the advancing time Tp and the adjusted former period t1' so that the sum of the adjusted former period and the adjusted latter period is equal to the advancing time Tp.

The three methods described above for adjusting the former period t1 and the latter period t2 aim to make the sum of the former period and the latter period substantially equal to the advancing time Tp so that the tray, which is influenced by indefinite factors, can move to the designated position smoothly and successfully.

The method for driving a movable component of a hardware device according to the embodiments of the invention at least has the following advantages:

1. The tray of every optical drive has a consistent driving result. Even if there exist some differences produced by the different manufacturing processes, the driving mode can be individually adjusted according to the tray's movement to fit in with the actual situation and thus can lead to consistent driving results. For example, the tray has uniform momentum when hitting the stoppers.

2. The same tray of a optical drive has a consistent driving result every time the tray is driven. Although the components of the optical drive will be worn out after being used for a period of time and the friction force between the tray and the guide will vary with the placement of the optical drive, the driving mode is adjusted to make the driving result consistent under the different operation conditions and at every different using age.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for driving a movable component of a hardware device, the movable component driven by a former force to move a former distance and then driven by a latter force to move a latter distance, wherein the former distance and the latter distance are added to obtain a driving distance, the method comprising the steps of:

driving the movable component to move the driving distance by the former force to determine a base time;

setting a reference time, wherein the reference time is smaller than the base time;

determining a former time according to the reference time, and determining the former distance and the latter distance according to the former time, the former force, and the base time;

determining a latter time according to the latter force and the latter distance, wherein the movable component is driven by the former force for the former time and then is driven by the latter force for the latter time.

2. The method of claim 1, wherein the former force is larger than the latter force.

3. The method of claim 1, wherein the movable component is driven by a motor.

4. The method of claim 3, wherein the motor provides the former force according to a first voltage and provides the latter force according to a second voltage.

5. The method of claim 4, wherein the first voltage is higher than the second voltage.

6. The method of claim 3, wherein A is a constant, the former distance=A×(the first voltage)×(the former time).

7. The method of claim 3, wherein A is a constant, the latter distance=A×(the first voltage)×(the base time−the former time).

8. The method of claim 3, wherein A is a constant, the latter time=(the latter distance)/[A×(the second voltage)].

9. The method of claim 3, wherein the former time equal to the reference time.

10. The method of claim 1, wherein the hardware device is an optical drive.

11. The method of claim 1, wherein the movable component is a tray.

12. A method for driving a movable component of a hardware device to move a driving distance, wherein the movable component is driven by a former force for a former time and then is driven by a latter force for a latter time, the method comprising the steps of:
- calculating an advancing time, which is required for the movable component to move the driving distance;
- adjusting at least one of the former period and the latter period according to the advancing time so that a sum of the former period and the latter period is substantially equal to the advancing time; and
- driving the movable component by the former force for the former time and driving the movable component by the latter force for the latter time.

13. The method according to claim 12, wherein the method comprises adjusting the latter time with fixed the former period so that a sum of the former time and the latter time is substantially equal to the advancing time.

14. The method according to claim 12, wherein the method comprises adjusting the former period with fixed the latter period so that a sum of the former period and the latter period is substantially equal to the advancing time.

15. The method according to claim 12, wherein the method comprises adjusting both the former period and the latter period so that a sum of the former period and the latter period is substantially equal to the advancing time.

16. The method according to claim 12, wherein the former force is larger than the latter force.

17. The method of claim 12, wherein the movable component is driven by a motor.

18. The method of claim 17, wherein the motor provides the former force according to a first voltage and provides the latter force according to a second voltage.

19. The method of claim 18, wherein the first voltage is higher than the second voltage.

20. The method of claim 12, wherein the hardware device is an optical drive.

21. The method of claim 12, wherein the movable component is a tray.

\* \* \* \* \*